(12) United States Patent
Netzer

(10) Patent No.: US 8,567,229 B2
(45) Date of Patent: Oct. 29, 2013

(54) METHOD FOR CALIBRATING A ROTATIONAL ANGLE SENSOR

(75) Inventor: Yishay Netzer, Misgav (IL)

(73) Assignee: Sick Sensors Ltd, D.N Misgav (IL)

( * ) Notice: Subject to any disclaimer, the term of this patent is extended or adjusted under 35 U.S.C. 154(b) by 418 days.

(21) Appl. No.: 12/907,057

(22) Filed: Oct. 19, 2010

(65) Prior Publication Data

US 2011/0113853 A1    May 19, 2011

(30) Foreign Application Priority Data

Nov. 13, 2009 (EP) ..................... 09014202

(51) Int. Cl.
*G01C 25/00* (2006.01)
(52) U.S. Cl.
USPC .......................................... 73/1.77
(58) Field of Classification Search
USPC .......................................... 73/1.77
See application file for complete search history.

(56) References Cited

U.S. PATENT DOCUMENTS

| 3,998,088 A | 12/1976 | Kazangey | 73/1.77 |
| 4,707,683 A | 11/1987 | Yao | 341/1 |
| 4,761,598 A * | 8/1988 | Lovrenich | 318/685 |

FOREIGN PATENT DOCUMENTS

WO    2008068542 A1    6/2008

OTHER PUBLICATIONS

European Search Report in the Counterpart Application No. 09014202.7, dated on Apr. 22, 2010, seven (7) pages.

* cited by examiner

*Primary Examiner* — Peter J. Macchiarolo
*Assistant Examiner* — Tamiko Bellamy
(74) *Attorney, Agent, or Firm* — Nath, Goldberg & Meyer; Jerald L. Meyer; Lakshmi Rajan

(57) ABSTRACT

A method for calibrating a rotational angle sensor having a rotor (12) coupled to a rotating shaft (10) in a manner which is faithful to the rotational angle, a stator (16), and a scanning means (14) arranged on the stator (16). The scanning means (14) scans a material measure of the rotor (12) and generates measured angle values associated with the rotational angle position of the rotor (12). A laser gyroscope (18) measures the angular velocity of the shaft (10). The signals from the laser gyroscope (18) which are dependent on the angular velocity of the shaft (10) are integrated over time with respect to the rotational angle. The measured angle values from the scanning means (14) are compared with reference angle values, and correction variables are formed from the differences. During measurement of the rotational angle, the measured angle values are corrected using the correction variable.

9 Claims, 3 Drawing Sheets

METHOD FOR CALIBRATING A ROTATIONAL ANGLE SENSOR

The invention relates to a method for calibrating a rotational angle sensor according to the precharacterizing clause of Patent Claim 1.

Rotational angle sensors are used to measure the rotational angle position of a rotating object. In particular, rotational angle sensors are used to measure the rotational angle position of a rotating shaft. In the case of servo drives, the rotational angle sensor is used to measure the rotational angle position of the driven motor shaft in order to regulate the actuating travel, the actuating speed, the actuating acceleration etc. of the servo drive. The rotational angle sensor has a rotor which is coupled to the rotating shaft to be measured in a manner which is faithful to the rotational angle, that is to say rotates with the rotating shaft in a clear angular relationship. For this purpose, the rotor may be directly mounted in a rotationally fixed manner on the rotating shaft to be measured, for example a motor shaft. The shaft may likewise be an input shaft of the rotational angle sensor, which input shaft is connected in a rotationally fixed manner to the shaft to be measured, for example the motor shaft. It is also possible to couple the rotor to the rotating shaft by means of a transmission, with the result that the rotational speed of the rotor is geared down or geared up with respect to the rotating shaft. The rotor has a material measure which is scanned by a stationary scanning means which is arranged on a stator of the rotational angle sensor, for example in a housing of the rotational angle sensor that is mounted in a stationary manner. In the case of an incremental rotational angle sensor, the material measure comprises an equidistant graduation, the rotational angle position of the rotor being measured by counting the increments in a manner dependent on the direction of rotation. In the case of an absolute rotational angle sensor, the material measure typically comprises binary coding of the respective rotational angle positions. A wide variety of designs of such rotational angle sensors belong to the prior art.

The accuracy of the angle values measured by a rotational angle sensor depends on numerous factors. On the one hand, the accuracy is determined by the accuracy of the material measure. In the case of rotational angle sensors with a high angular resolution in particular, a correspondingly high level of accuracy is associated with a large amount of production complexity. Furthermore, the accuracy of the angle values output by the rotational angle sensor is influenced by internal manufacturing tolerances of the rotational angle sensor. Finally, inaccuracies caused by tolerance errors result when fitting the rotational angle sensor to the object to be measured, for example to the motor of a servo drive.

In order to reduce such inaccuracies in the angle values output by the rotational angle sensor, U.S. Pat. No. 4,707,683 discloses the practice of calibrating the rotational angle sensor. For this purpose, a reference rotational angle sensor with a higher level of accuracy is fitted to the rotating shaft, preferably the shaft to be measured. The reference rotational angle sensor measures the rotational angle positions with its higher level of accuracy. The measured angle values of the rotational angle sensor to be calibrated and the reference angle values of the reference rotational angle sensor are measured and compared with one another for each rotational angle position. The differences between the measured angle value and the reference angle value are stored as correction variables in the form of a correction table in a non-volatile memory, the corresponding correction variable being associated with each measured angle value in this correction table. During the measurement operation, the measured angle values measured by the rotational angle sensor are each corrected using the associated correction variable and are output in the form of a corrected angle value.

This known method uses a reference rotational angle sensor whose fundamental construction corresponds to that of the rotational angle sensor to be calibrated. In order to achieve the higher level of accuracy of the reference rotational angle sensor, the latter is correspondingly complicated. The fitting tolerances of the reference rotational angle sensor influence the calibration accuracy, with the result that a correspondingly large amount of effort is needed to precisely fit the reference rotational angle sensor.

The invention is based on the object of specifying a method for calibrating a rotational angle sensor, which method enables calibration with a high level of accuracy and with considerably less complexity.

According to the invention, this object is achieved by means of a method having the features of Patent Claim 1.

Advantageous embodiments and developments of the invention are specified in the subclaims.

According to the invention, a gyroscope, preferably a laser gyroscope, is used as a reference rotational angle sensor in order to calibrate the rotational angle sensor. Even if any type of high accuracy gyroscope can be used, for instance a mechanical Dynamically Tuned Gyroscope, the invention is described hereinafter with reference to a laser gyroscope. Therefore, the term "laser gyroscope" is used instead of the more general term "gyroscope". However, any high accuracy gyroscope should be covered by the scope of the invention.

Laser gyroscopes are known per se. Laser gyroscopes are essentially based on the Sagnac effect. The light beam from a laser is divided into two partial beams which run counter to one another (in the clockwise direction and in the anticlockwise direction) on a closed path (loop) and in the process result in interference. If the closed path is rotated, the rotational movement of the path is additively superimposed on the speed of propagation of the laser beams in the case of the laser beam in one direction of movement and is subtractively superimposed on the speed of propagation of the laser beams in the case of the laser beam in the opposite direction of movement. This therefore results in a path length difference of the two laser beams which is dependent on the rotational speed of the closed path, with the result that the rotational speed can be measured using the interference pattern. Laser gyroscopes may be designed in two basic types. In the active laser gyroscope, which is also referred to as a ring laser gyroscope (RLG), the laser is situated inside the closed path. Such ring laser gyroscopes are described, for example, in U.S. Pat. No. 4,152,072 and DE 39 21 424 A1. In the passive laser gyroscope, which is also called a fibre optic gyroscope (FOG), the laser is situated outside the closed path formed by an optical waveguide and the laser beam is split and is coupled into the two ends of the optical waveguide. Such a fibre optic gyroscope is described, for example, in EP 585 954 B1 and EP 616 195 B1.

Some of the differences between the RLG and the FOG are as follows:

1. The output signal of the RLG is a pulse train with a frequency that is proportional to the inertial rotation rate. The accumulated (integrated) number of pulses is proportional to the rotation angle. The output of the FOG is an analog signal which depends nonlinearly on the inertial rate and similarly to the RLG requires time integration in order to obtain the travelled angle.
2. The non-linearity of the FOG is hard to perfectly compensate therefore errors can be generated when the rotation speed is not constant. In the RLG the angular distance corresponding to adjacent output pulses is highly constant over time and temperature.

According to the invention, in order to calibrate the rotational angle sensor, such a laser gyroscope is coupled to the rotating object—to simplify matters hereinafter referred to as "shaft"—in a manner which is faithful to the rotational angle, with the result that it rotates in synchronism with the shaft in a fixed angular dependence. The laser gyroscope can be mounted in such a manner that its closed light path surrounds the axis of the rotating shaft or that the closed light path is situated outside the rotating shaft and revolves around the latter. The arrangement selected depends on the installation conditions of the rotational angle sensor. In any case, the arrangement is such that the axis which is perpendicular to the plane of the closed light path of the gyroscope runs essentially parallel to the axis of rotation of the shaft. Any angular misalignment between the two axis will result in a scale factor error, which can however be compensated as described below.

In order to calibrate the rotational angle sensor, the laser gyroscope is coupled to the rotating object, e.g. the shaft or to the rotor in a manner which is faithful to the rotational angle. The rotational angle sensor is then used to measure the rotational angle position over one complete revolution of the rotating shaft to be measured by scanning the material measure. The angular velocity of the laser gyroscope is measured at the same time. In order to obtain the respective rotational angle position from the FOG, the angular velocity measured is integrated over time with respect to the rotational angle covered, thus obtaining the rotational angle position corresponding to the respective integration path. The measured angle value generated by the scanning means is compared with the reference angle value determined by the integrated FOG output. The difference between the measured angle value and the reference angle value is stored in the form of a table in a non-volatile memory in a manner associated with the respective measured angle value. The actual calibrating operation is thus concluded. The laser gyroscope can now be removed from the rotational angle sensor or from the rotating shaft to be measured in order to be used to calibrate another rotational angle sensor, if necessary.

When using a RLG the above integration is not needed and pulse counting is used instead.

When using the rotational angle sensor to measure the rotational angle, the measured angle values respectively obtained by scanning the material measure are corrected using the correction variables stored in the memory in a manner associated with this measured angle value, and the measured angle value corrected in this manner is output in the form of an angle value for further processing.

The method according to the invention is particularly suitable for calibrating rotational angle sensors having a large diameter, for example having a rotor diameter of 30 cm or more. Rotational angle sensors with a large diameter are used for instance in the case of large motors with a hollow bore on which the ring shaped sensor is mounted so that there is no solid mechanical shaft on which a conventional calibration encoder could be mounted. Such rotational angle sensors having a large diameter can be produced with a high angular resolution. Such a high angular resolution as a result of a corresponding graduation of the material measure can be produced in a cost-effective manner if the demands imposed on the accuracy of the graduation of the material measure are not too high. In contrast, the accuracy of the angle measurement using the laser gyroscope is very high since this angle measurement is based on the phase shift of the laser light. Since the FOG primarily measures the rotational speed, the gyroscope output angle is obtained by integrating its output with respect to time. Hereby the noise component of the output is also integrated and the integrated noise component which is of the "random walk" type tends to increase with time. Therefore the measurement (shaft rotation speed) should be as fast as possible to minimize the angular error. The data processing itself can be made off-line.

According to the invention, this results in the advantage that a rotational angle sensor with a high angular resolution and a high level of accuracy can be produced in an extremely cost-effective manner. The high angular resolution can be achieved in a cost-effective manner since the demands imposed on the accuracy of the material measure are not high. The high level of accuracy is achieved by means of the calibration with the laser gyroscope. Since the laser gyroscope is respectively needed only to calibrate the rotational angle sensor, the relatively expensive laser gyroscope can be used to calibrate a multiplicity of rotational angle sensors, with the result that the costs of the laser gyroscope are of no consequence. As described above the accuracy of mounting the gyroscope is not important with respect to the accuracy of calibration.

The rotational angle sensor can be calibrated during its production and assembly. As a result of the calibration, the inaccuracies in the material measure, installation tolerances and possible installation eccentricities are eliminated in this case.

The calibration can also advantageously be carried out only when the rotational angle sensor has been mounted on the measurement object, for example on the motor of a servo drive. An important case also are ring shaped sensors which because of their large size are produced from segments and assembled in situ. Calibrating the rotational angle sensor which has already been mounted on the measurement object has the additional advantage that not only the internal inaccuracies and tolerances of the rotational angle sensor but also the fitting tolerances and inaccuracies in coupling the rotational angle sensor to the measurement object are taken into account and eliminated during fault correction.

For an exact calibration it is necessary that the scale factor of the gyroscope is known with an accuracy compatible with the calibration accuracy requested. Therefore, in an embodiment of the invention an error compensation is carried out to obtain the accurate scale factor of the gyroscope.

In some conditions, laser gyroscopes are susceptible to temperature fluctuations, vibrations and electronic drifts. Such drifts do not influence the calibration of the rotational angle sensor in practice since only a single revolution of the rotating shaft is required for the entire calibrating operation. The calibration can thus be carried out in a very short period of time within which no disadvantageous drifts occur.

Furthermore, laser gyroscopes are also influenced by the earth's rotation. The influence of the earth's rotation is relatively slight but depends on the geographical latitude and on the orientation of the rotational axis relative to the local vertical. Also, the drifts and earth rotation influences can be eliminated by the error compensation procedure.

The invention is explained below using an exemplary embodiment which is diagrammatically illustrated in the drawing, in which.

Figure 1:
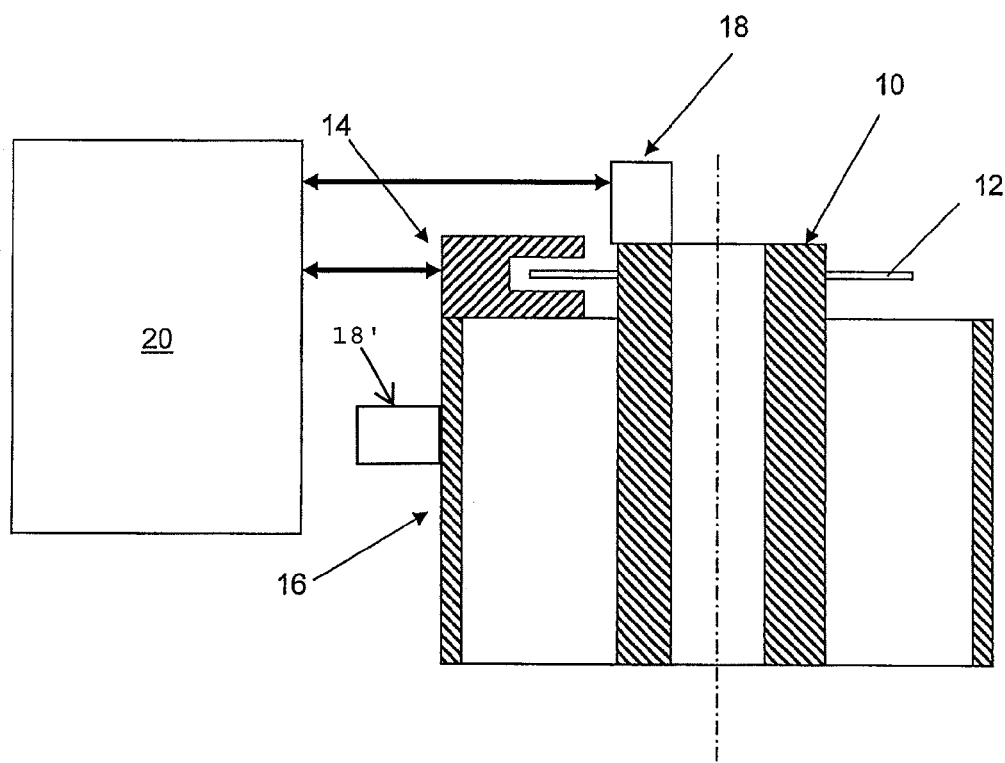
FIG. 1 shows a rotational angle sensor in section during calibration.

FIG. 1 diagrammatically shows an axial section of a rotational angle sensor as is fitted, for example, to the motor of a servo drive.

A rotor 12 is placed onto the shaft 10 of the motor (not illustrated) in a rotationally fixed manner. In a manner known per se, the rotor 12 has an incremental or absolute material measure which is scanned by a scanning means 14. In a known manner, scanning can be carried out optically, magnetically, inductively, capacitively or in some other manner. The scanning means 14 is stationary arranged in a stator 16 which can also form the housing of the rotational angle sensor, for example. The stator 16 is connected to the housing of the motor (not illustrated) in a rotationally fixed manner. A laser gyroscope 18 is arranged on the rotating shaft 10 in a rotationally fixed manner and thus rotates around the axis of the shaft 10 in synchronism with the latter and in a manner which is faithful to the rotational angle.

Figure 2:
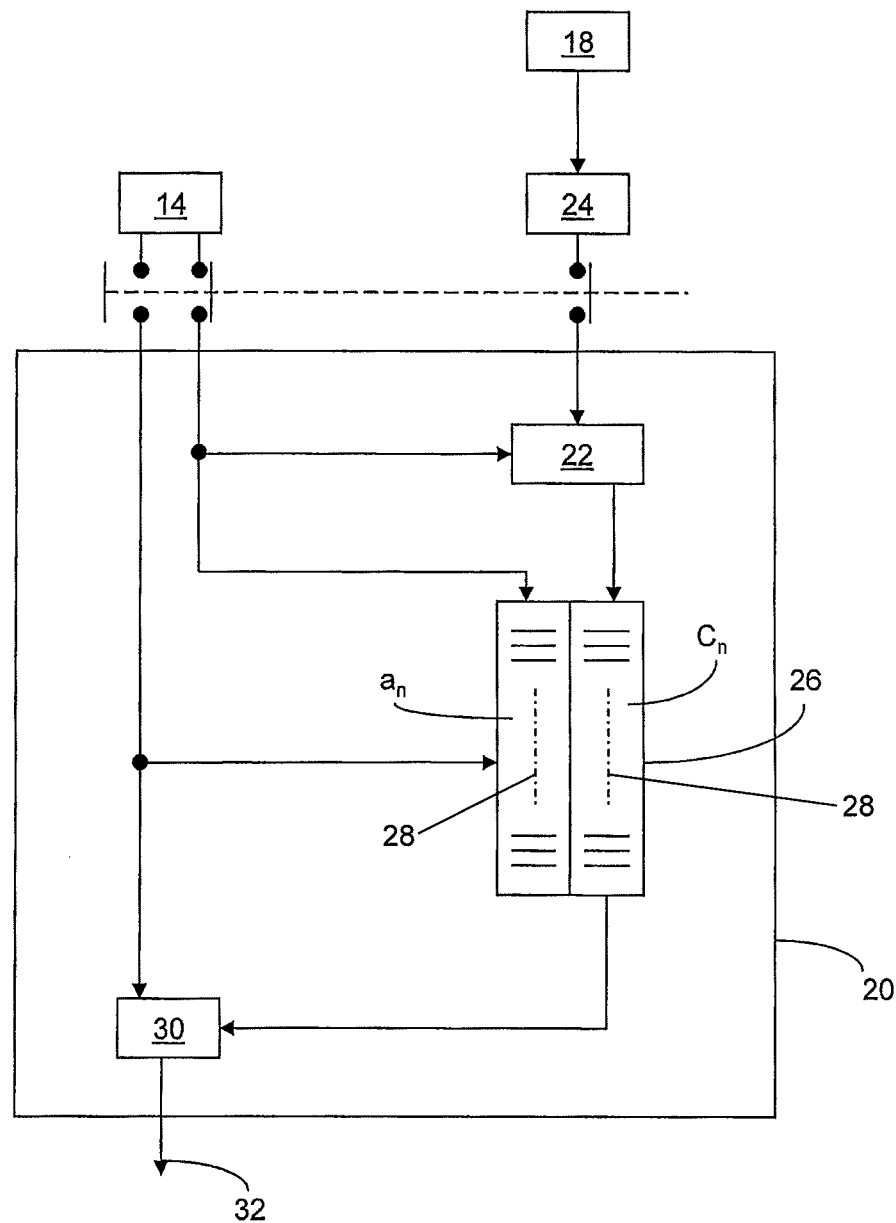
FIG. 2 shows a block diagram of the calibration of the rotational angle sensor.

The signals from the scanning means 14 and from the laser gyroscope 18 are supplied to an electronic evaluation means 20 and are processed in the manner explained using FIG. 2.

During the calibration shown in FIG. 2, the shaft 10 with the rotor 12 and the laser gyroscope 18 is rotated through one (or more) complete revolution. In this case, the scanning means 14 scans the material measure of the rotor 12 and generates measured angle values corresponding to the respective rotational angle position of the rotor 12. These measured angle values are supplied to a comparator 22. At the same time, the laser gyroscope 18 measures the angular velocity of the shaft 10. This angular velocity is in the case of FOG integrated over time with respect to the respectively covered rotational angle in an integrator 24, with the result that reference angle values associated with the respective rotational angle position of the shaft 10 are obtained. These reference angle values are likewise supplied to the comparator 22. The respective current measured angle values of the scanning means 14 are compared with the reference angle values of the laser gyroscope 18 in the comparator 22. A correction variable is formed from the difference between the measured angle value and the reference angle value. A correction table in which each measured angle value $a_n$ coming from the scanning means 14 is associated with the correction variable $C_n$ calculated for this measured 30 angle value is stored in a non-volatile memory 26 (EPROM).

The calibrating operation is thus concluded and the laser gyroscope 18 can be removed from the rotational angle sensor or the shaft 10. The evaluation means 20 is now changed over to measurement operation. This is symbolically shown in FIG. 2 by the fact that the changeover switch 28 which is depicted using dashed lines is moved to the right.

During measurement operation, the measured angle values determined by the scanning means 14 are supplied to a correction unit 30. At the same time, the memory 26 is addressed using the measured angle values and outputs the correction variable $c_n$ associated with the respective current measured angle value $a_n$ to the correction unit 30. In the correction unit 30, the measured angle value coming from the scanning means 14 is corrected according to the correction variable, and the measured angle value corrected in this manner is output in the form of an angle value 32 for further processing.

For the accuracy of the calibration of the rotational angle sensor, it is necessary to know the angular range over which the gyroscope output integration takes place with an accuracy compatible with the calibration accuracy requested. Calibrating the gyro involves two steps:
1. Determining the gyro output bias (output signal when the shaft is at stand still).
2. Determining the gyro scale factor (which includes the effect of misalignment between the mechanical rotation axis and the gyro sensitive axis).

The gyro scale factor can be obtained by measuring its indicated angle when rotated a mechanical angle which is very accurately known. In principle, this could be done over an arbitrary angular range if an exactly calibrated reference angular range would be available. Therefore, in practice the invention exploits the fact that the angular range of a full rotation of the rotor 12 is 360°. So, the rotational angle sensor to be calibrated should only resolve the angular range of a full rotation with an accuracy corresponding to the desired accuracy. All angle sensors are repeatable with an accuracy of a full rotation limited only by the electronic noise. Therefore, the angle sensor to be calibrated can be used for establishing one full revolution starting and ending at the same index position with an accuracy limited only by the resolution of the angle sensor. By this way, the scale factor of the gyroscope can be calculated by integrating the gyroscope output over the angular range of one full revolution of the rotor 12 of the angle sensor to be calibrated.

Figure 3:
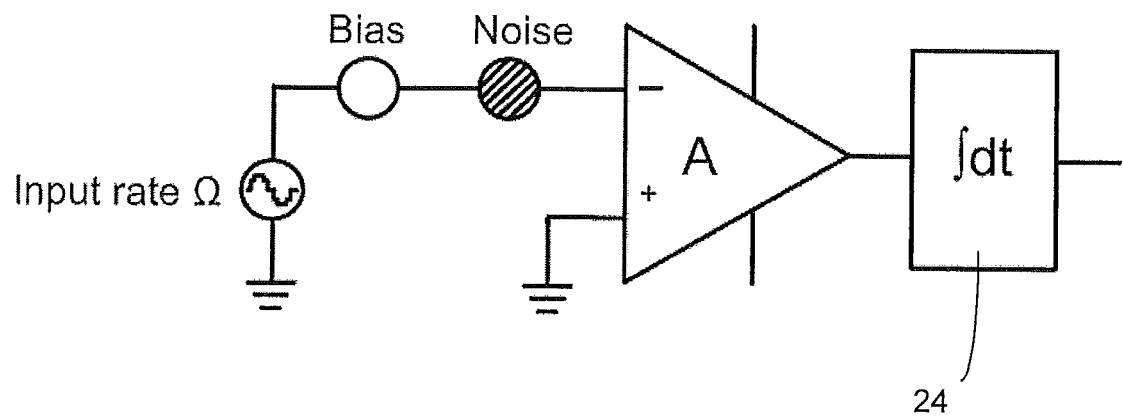
FIG. 3 shows schematically the influences on the gyroscope signals.

FIG. 3 shows the error influences on the gyroscope output schematically. It includes a constant bias error, a random error depicted as noise and a scale factor A symbolized by an amplifier which represents the sensitivity (gain) of the gyroscope.

The compensation of the scale factor is based on the fact that a complete revolution is exactly 360°. Therefore an accurate identification of the start/end position must be made. When calibrating an encoder with sine/cosine output signals a start/end point can be chosen and repetitively identified. In such encoder there are typically many periods per revolution, and a start/end point can for example be defined as the zero crossing of the sine signal in a particular period. The accuracy of this method is limited by two factors: 1. The finite time period between successive samples. 2. Noise due to quantization and inherent noise in the signal itself. The error due to those two factors can be substantially eliminated by calculating the start/end point based on more than one zero crossing. This can be done by identifying part, or all, of the other zero crossings, and averaging their angular positions while taking into account their known nominal angular position relative to the chosen zero start/stop point. Alternatively multiple sampled points adjacent to the nominal start/end point can be used to extrapolate its precise position.

Alternatively means independent from the encoder can be used. For example a mirror can be mounted on the rotating shaft and an optical light source and light receiver—preferably an autocollimator system—are mounted stationary. A pulse will be generated each time the autocollimator axis is perpendicular to the mirror surface.

The reference angle as obtained by time integration of the FOG output was found to be contaminated by two factors:
1. The output signal is not perfectly proportional to the rotation rate.
2. The output signal includes a random noise due to internal physical mechanisms which when integrated results in the so called "random walk" angular error.

The first factor is minimized by compensation look-up table. The second factor is minimized by averaging several revolutions. Averaging the result of N revolutions reduces the random walk by the square root of N. This is due to the fact the gyro noise is a random function of time and it is not correlated (or only weakly correlated) in consecutive revolutions. In contrast, using a conventional encoder, such as an optical encoder as a reference the resulting error is substantially the same in each rotation, and averaging does not improve the accuracy (except for noise related error).

Another aspect of the invention is to provide a calibration accuracy ignoring earth-rotation induced errors independent of the geographical latitude of the location where the rotational angle sensor is used and independent of the orientation of the rotation axis relative to the local vertical. The earth is rotating around its axis with a rate of 360°/24 hr=0.0042°/sec. At a geographical latitude α the rotational rate is 0.0042°/sec×cos α. For example, at a latitude of 32°, the rotation rate is 0.0036°/sec. Therefore, with a test duration of 10 sec for one revolution of the gyroscope, the gyroscope will measure 360°+0.036°.

The error due to the earth rotation and the error due to the bias of the gyroscope result in a total error ⊖ of the reference angle value associated with the respective rotational angle position of ⊖=∫(gyrobias+earth rate)dt.

According to the invention, this error can be compensated and eliminated by different compensation methods.

Method 1:

The output voltage of the gyroscope 18 is measured when the rotor 12 is stationary to obtain the total offset (bias+earth rate). This value of the total offset is subtracted from the output of the gyroscope 18 before integrated in the integrator 24. Then, the rotor 12 is rotated and the offset corrected output of the gyroscope is integrated over a full rotation of the rotor 12 and divided by 360° to obtain the error compensated angular scale factor.

Method 2:

The rotor 12 and the gyroscope are rotated for a full rotation of 360° clockwise and then counter-clockwise. Summing of the integrated gyroscope output over the clockwise rotation and the counter-clockwise rotation would be equivalent to zero rotation of the angle sensor but the integrated gyroscope output would be ⊖=∫(gyrobias+earth rate)dt.

Subtracting the two integrals and dividing by 2 will provide an angle of 360° as measured by the gyroscope and hence the scale factor of the gyroscope.

This method provides the following advantages:

The gyroscope can be mounted on the shaft and still be powered and communicate with the non rotating portions of the measuring system by means of a cable without the need for sliprings or wireless communication.

The gyroscope bias and the earth rotation components in each phase are cancelled.

Method 3:

An additional second gyroscope (18') is mounted to the stationary stator of the rotational angle sensor, e.g. on the motor stator. This second gyroscope (18') measures only the error influence of bias and earth rotation. Therefore, the angle values measured by the gyroscope 18 can be corrected by the output of the additional second gyroscope (18') in order to compensate the error of the bias and the earth rotation as well.

The invention claimed is:

1. Method for calibrating a rotational angle sensor having a rotor (12) which is coupled to a rotating object (shaft 10) in a manner which is faithful to the rotational angle, a stator (16), and a scanning means (14) which is arranged on the stator (16), the scanning means (14) scanning a material measure of the rotor (12) and generating measured angle values associated with a rotational angle position of the rotor (12), said method having the following steps:

providing a reference rotational angle sensor that measures the rotational angle position of the rotor (12) and generates reference angle values associated with the respective rotational angle position of the rotor (12);

the measured angle values are compared with the reference angle values associated with the corresponding rotational angle position;

a correction variable associated with the respective measured angle value is formed from the difference between the measured angle values and the reference angle values;

the measured angle values ($a_n$) and their respective associated correction variables ($c_n$) are stored in the form of a correction table in a non-volatile memory (26);

during measurement of the rotational angle, the measured angle values are corrected using the correction variable ($c_n$) which is associated with the respective measured angle value ($a_n$) and is stored in the correction table, and the corrected measured angle value is output in the form of an angle value (32); wherein a laser gyroscope (18) is used as a reference rotational angle sensor, in that the laser gyroscope (18) is coupled to the rotating object (shaft 10) in a manner which is faithful to the rotational angle in order to calibrate the rotational angle sensor and rotates, with said object, around the axis of the object (shaft 10), in that the signals from the laser gyroscope which are dependent on the angular velocity of the object (shaft 10) are integrated over time with respect to the rotational angle for one revolution of the object (shaft 10), in that each rotational angle position is associated with, as a reference angle value, the signals from the laser gyroscope (18) which have been integrated as far as this rotational angle position, wherein the laser gyroscope (18) is releasably coupled to the object (shaft 10), in that the laser gyroscope (18) is coupled to the object (shaft 10) following installation of the rotational angle sensor for the purpose of calibration, and in that the laser gyroscope (18) is separated from the object (shaft 10) again following calibration, and wherein the signals of the laser gyroscope (18) are error compensated before being compared with the measured angle values.

2. Method according to claim 1, characterized in that the laser gyroscope (18) is a fibre optic gyroscope.

3. Method according to claim 1, characterized in that the laser gyroscope (18) is a ring laser gyroscope.

4. Method according to claim 1, characterized in that the angle values of the laser gyroscope (18) are compensated by a scale factor (A) determined by rotating the rotor (12) for one full revolution and defining the integrated reference angle value as 360°.

5. Method according to claim 4, characterized in that the integrated angle value is measured for a number of N full revolutions and the average of the N values is used for reducing the influence of the noise of the angle sensor on defining the reference angle of 360°.

6. Method according to claim 1, characterized in that the angular error of the fibre optic gyroscope used as laser gyroscope (18) is reduced by averaging random walk of the signals over several revolutions.

7. Method according to claim 1, characterized in that the errors to be compensated are determined by rotating the rotor (12) for a full revolution clockwise and subsequently counter-clockwise.

8. Method according to claim 1, characterized in that a second laser gyroscope is arranged on the stator (16) as a compensation laser gyroscope, and in that the errors of the reference angle value from the laser gyroscope (18) are eliminated by comparison with the compensation laser gyroscope.

9. Method according to claim 2, characterized in that the angular error of the fibre optic gyroscope used as laser gyroscope (18) is reduced by averaging random walk of the signals over several revolutions.

\* \* \* \* \*